United States Patent [19]

Steinmann

[11] 4,419,081

[45] Dec. 6, 1983

[54] MATHEMATICAL TEACHING/LEARNING AID AND METHOD OF USE

[76] Inventor: Phyllis R. Steinmann, 6928 E. Sunnyvale Rd., Scottsdale, Ariz. 85253

[21] Appl. No.: 410,533

[22] Filed: Aug. 23, 1982

[51] Int. Cl.³ .................. G09B 1/36; G09B 19/02
[52] U.S. Cl. .......................... 434/188; 273/157 R; 434/208
[58] Field of Search .............. 434/188, 191, 196, 208, 434/171; 273/157 R

[56] References Cited

U.S. PATENT DOCUMENTS

| | | | |
|---|---|---|---|
| 2,654,963 | 10/1953 | Van Dijk | 434/208 X |
| 2,826,829 | 3/1958 | Koons | 434/196 |
| 3,212,201 | 10/1965 | Jensen | 434/191 X |
| 3,302,310 | 2/1967 | Leven | 434/171 |
| 3,333,351 | 8/1967 | Williams | 434/171 |
| 3,423,849 | 1/1969 | Jordan et al. | 434/188 |
| 3,696,533 | 10/1972 | Mortensen | 434/208 |
| 3,708,169 | 1/1973 | Hoy | 434/191 X |
| 3,924,859 | 12/1975 | Kramer | 434/191 X |
| 4,044,476 | 8/1977 | Marsh | 434/171 |
| 4,212,117 | 7/1980 | Baldwin et al. | 434/208 |

*Primary Examiner*—William H. Grieb
*Attorney, Agent, or Firm*—Cahill, Sutton & Thomas

[57] ABSTRACT

A mathematical teaching/learning aid includes a set of thin mathematical cards or blocks, the set including six different types of blocks that represent the numbers $+1$, $-1$, $+X$, $-X$, $+X^2$, and $-X^2$, respectively. A plurality of blocks of each type are included in the set. The numbers $+1$, $-1$, $+X$, $-X$, $+X^2$ and $-X^2$ are referred to as "block type" indicia, and are printed in the center of the two opposed major faces of each corresponding type block. Four edge indicia or dimensions are printed adjacent to each of the respective edges of each face of each block. The product of the edge indicia at adjacent edges of each face is equal to the "block type" indicia of that block. Mating edge alignment tabs and notches or mating edge alignment indicia are provided at or adjacent to each edge of each block to allow edge-to-edge mating of each block with another block in only one configuration. The set of blocks is used to enchance the teaching and learning process for the mathematical operations of addition, subtraction, factoring, algegraic expressions, and completing the square of algebraic expressions.

9 Claims, 7 Drawing Figures $$2+x^2-4x+3x+3+2x$$

Fig-2

MATHEMATICAL TEACHING/LEARNING AID AND METHOD OF USE

SUMMARY OF THE INVENTION

Briefly described and in accordance with one embodiment thereof, the invention provides a set of mathematical blocks that are useful in teaching and learning certain mathematical operations, including factory algebraic expressions and completing the square of certain algebraic expressions, each of the blocks having a front face, a back face, a top edge, a right edge, a bottom edge, and a left edge, the set including a plurality of $+1$ block each having on its front face four edge dimension indicia referred to as $+1$ dimensions adjacent to its top, right, bottom, and left edges, respectively, and having on its back face four dimension indicia referred to as $-1$ dimensions adjacent to its top, right, bottom, and left edges, respectively, a plurality of blocks that are referred to as $+X$ blocks each having on its front face two edge dimension indicia referred to as $+X$ dimensions adjacent to its top and bottom edges and two edge dimension indicia referred to as $+1$ dimensions adjacent to its left and right edges, and having on its back face two edge dimension indicia referred to as $-X$ dimensions adjacent to its top and bottom edges and two edge dimension indicia referred to as $-1$ dimensions adjacent to its right and left edges, respectively, a plurality of $+X^2$ blocks each having on its front face four edge dimension indicia referred to as $+X$ dimensions adjacent to its top, right bottom and left edges, respectively and having on its back face a plurality of edge dimension indicia referred to as $-X$ dimensions adjacent to its top, right, bottom and left edges, respectively, a plurality of $-1$ blocks each having on its front face two edge dimension indicia referred to as $-1$ dimensions adjacent to its top and bottom edges and two edge dimension indicia referred to as $+1$ dimensions adjacent to its right and left edges, respectively, and having on its rear face two edge dimension indicia referred to as $+1$ edge dimensions adjacent to its top and bottom edges, respectively, and two edge dimension indicia referred to as $-1$ edge dimensions adjacent to its left and right edges, respectively, a plurality of $-X$ blocks each having on its front face two edge dimension indicia referred to as $-X$ edge dimensions adjacent to its top and bottom edges and two edge dimension indicia referred to as $+1$ dimensions adjacent to its right and left edges and having on its rear face two edge dimension indicia referred to as $+X$ edge dimensions adjacent to its top and bottom edges and two edge dimension indicia referred to as $-1$ edge dimensions adjacent to it right and left edges, a plurality of $-X^2$ blocks each having on its front face two edge dimension indicia referred to as $-X$ edge dimension indicia adjacent to its top and bottom edges and two edge dimension indicia referred to as $+X$ edge dimensions adjacent to its left and right edges and having on its rear face two edge dimension indicia referred to as $+X$ edge dimensions adjacent to its top and bottom edges and two edge dimension indicia referred to as $-X$ edge dimensions adjacent to its right and left edges, each of the blocks having at each of its edges an edge alignment element for effecting prooper alignment of that edge with only one edge of any of the other blocks. In the described embodiment of the invention, the lengths of each of the edges of the blocks having $+1$ edge dimensions or $-1$ edge dimensions are equal and the lengths of each of the edges of the blocks having $+X$ edge dimensions or $-X$ edge dimensions are equal to each other, the edges with $+X$ or $-X$ edge dimensions being different in length than the edges having $+$ or $-1$ edge dimensions. In the described embodiments of the invention, the front and back faces of each block representing a positive number, namely the $+1$, $+X$ and $+X^2$ blocks, are blue. The front face and back face of each of the blocks representing a negtive number, namely the $-1$, $-X$, and $-X^2$ blocks, are rose colored or red. In one embodiment of the invention, the edge alignment elements include a tab and a mating groove that mates with a tab from another block when the edges are properly aligned in edge to edge contact. In another embodiment of the invention, the edge alignment elements include indicia printed on the front and rear faces of the blocks such that the edge alignment elements form "V's" only when the blocks are properly aligned in edge to edge contact.

BRIEF DESCRIPTION OF THE DRAWINGS

FIG. 2 is a plan view of blocks of the present invention mated and grouped to illustrate the operations of addition to accomplish grouping of like terms of an algebraic expression.

BACKGROUND OF THE INVENTION

The invention relates to devices and methods that are useful in teaching and learning mathematics, especially the factoring of algebraic expressions.

Learning and understanding some of the basic concepts of mathematics can be quite difficult for many people, children, teenagers and adults alike. It is often very helpful to be able to visualize concepts that may be rather abstract, rather than simply memorize particular techniques for solving particular types of problems. Various machines and devices have been used to make it easier for the mathematics student to visualize mathematical operations. U.S. Pat. Nos. 2,826,829; 3,423,849; 3,708,169; 3,212,201 and 3,696,533 are deemed illustrative of the state of the art in devices that use blocks and the like with various indicia thereon to illustrate simple operations such as addition, subtraction, and balancing of equations. However, it is much more difficult to conceptualize the processes of "factoring" that are necessary to solve many equations. Due to the substantially higher level of difficulty that many students experience in understanding factoring and a related procedure called "completing the square", it would be very advantageous to have a simple, economical, easily understood apparatus that could be used by students to provide a basis for visualizing and understanding the factoring process.

Accordingly, it is an object of the invention to provide a relatively simple, inexpensive set of mathematics blocks and a method of using them that facilitates and enhances a student's understanding of numbers, algebraic variables, and factoring of algebraic expressions.

DESCRIPTION OF THE INVENTION

Figure 1A:
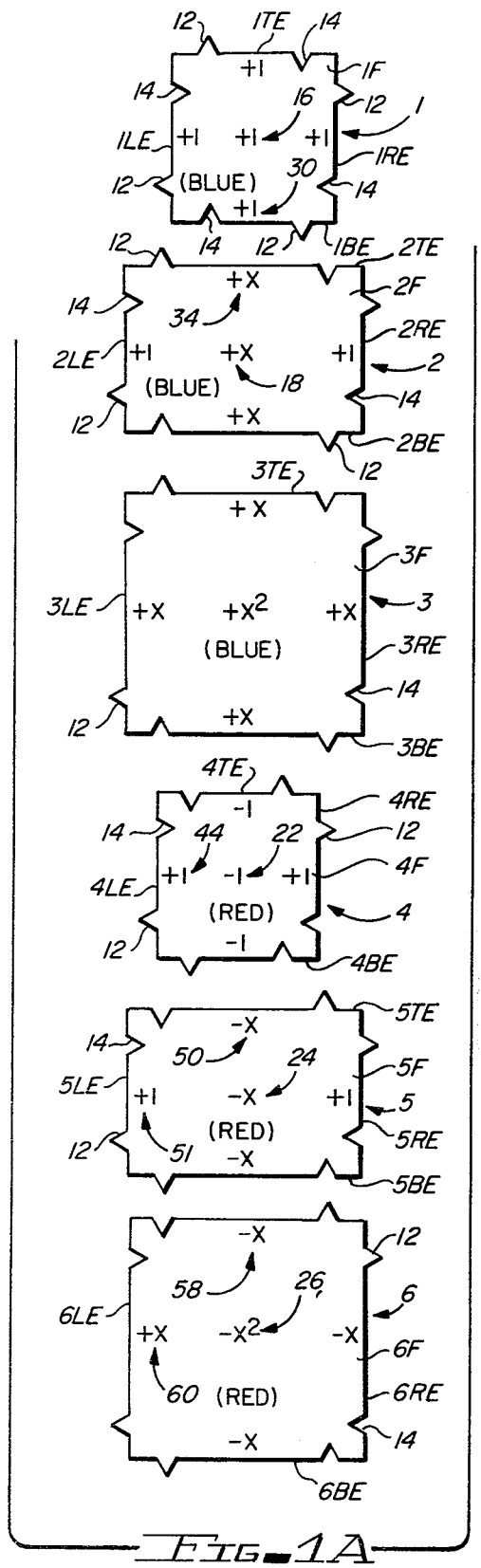
FIG. 1A is a plan view of the front faces of each of the six types of mathematics blocks included in a set in accordance with the present invention.

Referring now to the drawings, FIG. 1A shows the front face of each of the six different types of cards or blocks that make up a complete "set" in accordance with the present invention. By way of definition, the mathematical cards are blocks and will be referred to herein as "mathematical blocks", or simply as "blocks". This term is intended to encompass both thin and thick blocks. A complete set of the mathematical blocks includes a convenient number of each of the six types. The first type of block is designated by reference number 1 and is referred to as a "+1 block". The second type, designated by reference number 2, is referred to as a "+X block". The third type of mathematics block is designated by reference numeral 3 and is referred to as a "+$X^2$ block". The fourth type is referred to as a "−1 block", and is designated by reference numeral 4. Reference numeral 5 designates the fifth type of mathematics block, which is referred to as an "−X block". Finally, reference numeral 6 refers to the sixth type of mathematics block, which is referred to as a "−$X^2$ block". The +1 block designated by reference numeral 1 in FIG. 1A has a front surface designated by reference numeral 1F. It has a top edge designated by reference numeral 1TE, a right edge 1RE, a bottom edge 1BE, and a left edge 1LE. Each of the edges of each +1 block is of equal length. The indicia +1 is printed boldly in the center of block 1, an is designated by reference numeral 16. Four "edge dimension indicia", such as the +1 edge indicia designated by reference numeral 30, are printed on front surface 1F in FIG. 1, adjacent to each of the four edges, respectively.

Figure 1B:
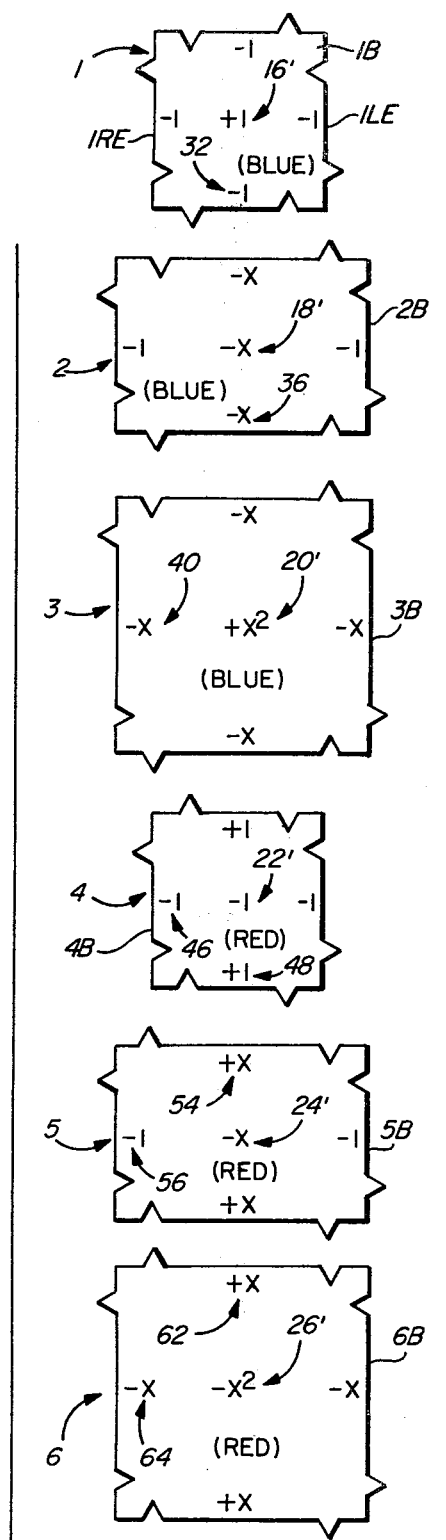
FIG. 1B is a plan view of the back faces of each of the blocks shown in FIG. 1A.

Referring to FIG. 1B, the "back" surface of block 1 is designated by reference numeral 1B. It has four "−1 edge indicia", such as the one designated by reference numeral 32, printed adjacent to the four respective edges of the back face of block 1. A "block type" indicia +1 is printed in the middle of the back face 1B of block 1, as indicated by reference numeral 16' in FIG. 1B.

Similarly, X block 2 has a top edge 2TE, a right edge 2RE, a bottom edge 2BE, and a left edge 2LE. The "block type" indicia +X is printed on its front face 2F, as indicated by reference numeral 18 in FIG. 1A. The indicia +X also is printed on the back face 2B of block 2, as indicated by reference numeral 18'. The edge indicia +X, such as 34 in FIG. 1A, are printed on front face 2F of block 2 adjacent to edge 2TE and bottom edge 2BE. The edge indicia "+1" are printed on front face 2F adjacent to right edge 2RE and left edge 2LE of mathematics block 2. Similarly, on the back face 2B of block 2 (see FIG. 1B), the edge indicia −X are printed adjacent to the top and bottom edges, and the −1 edge indicia are printed adjacent to edges 2RE and 2LE. The right and left edges of the +X blocks are exactly the same length as the edges of the +1 blocks.

However, it must be noted that the top and bottom edges of the +X blocks are longer than the right and left edges thereof, as illustrated. (However, this is not essential. The top and bottom edges could be shorter than the longer edges).

The +$X^2$ blocks, such as the one designated by reference numeral 3 in FIG. 1A, each have a front face 3F, on the center of which is printed a "block type" indicia +$X^2$, as indicated by reference numeral 20, and four +X edge indicia, such as the one indicated by reference numeral 38 along the four respective edges of block 3. The four edges of mathematics block 3 are equal in length. On the center of back face 3B of block 3, the +$X^2$ "block type" indicia 20' is printed, and an edge indicia −X is printed adjacent to each of the four edges, as indicated by reference numeral 40.

Preferably, both the front and rear faces of the +1 blocks, the +X blocks and the +$X^2$ are all selected to be a particular color, for example, blue, to indicate that these blocks represent positive numbers.

Mathematics blocks 4, 5 and 6, referred to as the "−1", "−X", and "−$X^2$" in FIGS. 1A and 1B, represent negative numbers. Preferably, both the front and rear faces of the negative number blocks are a different color, for example, red.

The −1 cards have exactly the same physical dimensions as the +1 cards. The −X cards have exactly the same dimensions as the +X cards, and the −$X^2$ cards have exactly the same physical dimensions as the $X^2$ cards. As before, the center of front face 4F of card 4 has a −1 "block type" indicia printed thereon, as indicated by reference numeral 22 in FIG. 1A; the same indicia −1 also is printed on the center of its back face 4B, as indicated by reference numeral 22' in FIG. 1B. The edge indicia −1 is printed adjacent to the top edge 4TE and the bottom edge 4BE of the front face 4F of mathematics block 4, as indicated by reference numeral 42 in FIG. 1A. The edge indicia +1 is printed adjacent to the right edge 4RE and the left edge 4LE, as indicated by reference numeral 44 in FIG. 1A. On back side 4F of mathematics block 4, the edge indicia +1 is printed adjacent to the top and bottom edges, as indicated by reference numeral 48 in FIG. 1B and the edge indicia −1 is printed adjacent to the right and left edges as indicated by reference numeral 46.

The block type indicia −X is printed in the center of the front face 5F of mathematics block 5, as indicated by reference numeral 24 in FIG. 1A and is also printed in the center of the back face 5B, as indicated by reference numeral 24' in FIG. 1B. The edge indicia +1 is printed adjacent to the left and right edges 5LE and 5RE, respectively, of block 5 and the edge indicia −X is printed adjacent to the edge 5TE and 5BE, as indicated by reference numeral 52 in FIG. 1A. On the back face 5B, the edge indicia +X is printed adjacent to the top and bottom edges, as indicated by reference numeral 54 in FIG. 1B. The indicia −1 is printed adjacent to the right and left edges, as indicated by reference numeral 56 in FIG. 1B.

The "block type" indicia −$X^2$ is printed in the center of front face 6F of mathematics block 6, as indicated by reference numeral 26 in FIG. 1A and also in the center of the back face 6B, as indicated by reference numeral 26' in FIG. 1B. The edge indicia +X is printed adjacent to edges 6RE and 6LE of the front face 6F of block 6, as indicated by reference numeral 60 in FIG. 1A. As indicated by reference 58 in FIG. 1A the edge indicia −X is printed adjacent to the top edge 6TE and the bottom edge 6BE. On the back face 6B, the edge indicia +X is printed adjacent to the top and bottom edges, as indicated by reference numeral 62 in FIG. 1B and the edge indicia −X is printed adjacent to the left and right edges, as indicated by reference numeral 64 in FIG. 1B.

In accordance with the present invention, each of the edges of each of the mathematics blocks shown in FIG.

1A has a V-shaped tab 12 and a V-shaped notch 14 in it. Each of the tabs 12 is positioned precisely opposite to a notch 14 in the opposed edge of the same block. In each of the positive number mathematics blocks 1, 2 and 3, one tab 12 and one notch 14 are disposed on either side of each corner. However, the tabs 12 and notches 14 are differently arranged in the edges of the negative number mathematics blocks 4, 5, and 6. More specifically, in each of the negative number mathematics blocks, two tabs 12 are disposed on either edge of the upper right and lower left corners of the block when its front surface is being viewed. A notch 14 is disposed in each edge adjacent to the upper left hand corner and lower right hand corner of each of the negative number blocks.

Upon careful consideration, it can be seen that each edge of any of the mathematics blocks shown in FIG. 1A can be mated in edge to edge contact with other blocks in only certain ways. More specifically, each block can be aligned in edge to edge contact with another block if an edge of that block has the same edge indicia and if the tab 12 of one edge of the block mates perfectly with the recess 14 of the edge of the other block and vice-versa.

It should be noted that if it is inconvenient to provide mating tabs 12 and notches 14 as shown in FIG. 1, then mating alignment indicia can be printed along each of the edges of each face of each block. In the remaining drawings, such edge alignment indicia are shown instead of tabs 12 and notches 14. When, and only when, the edges of the blocks are properly aligned in edge to edge contact, the edge alignment indicia form a pair of "V's".

The mathematics blocks described above can be easily used to illustrate addition and subtraction. For example, FIG. 2 illustrates use of the mathematics blocks to add the terms of the expression $$2 + X^2 - 4X + 3X + 3 + 2X.$$

Figure 2:
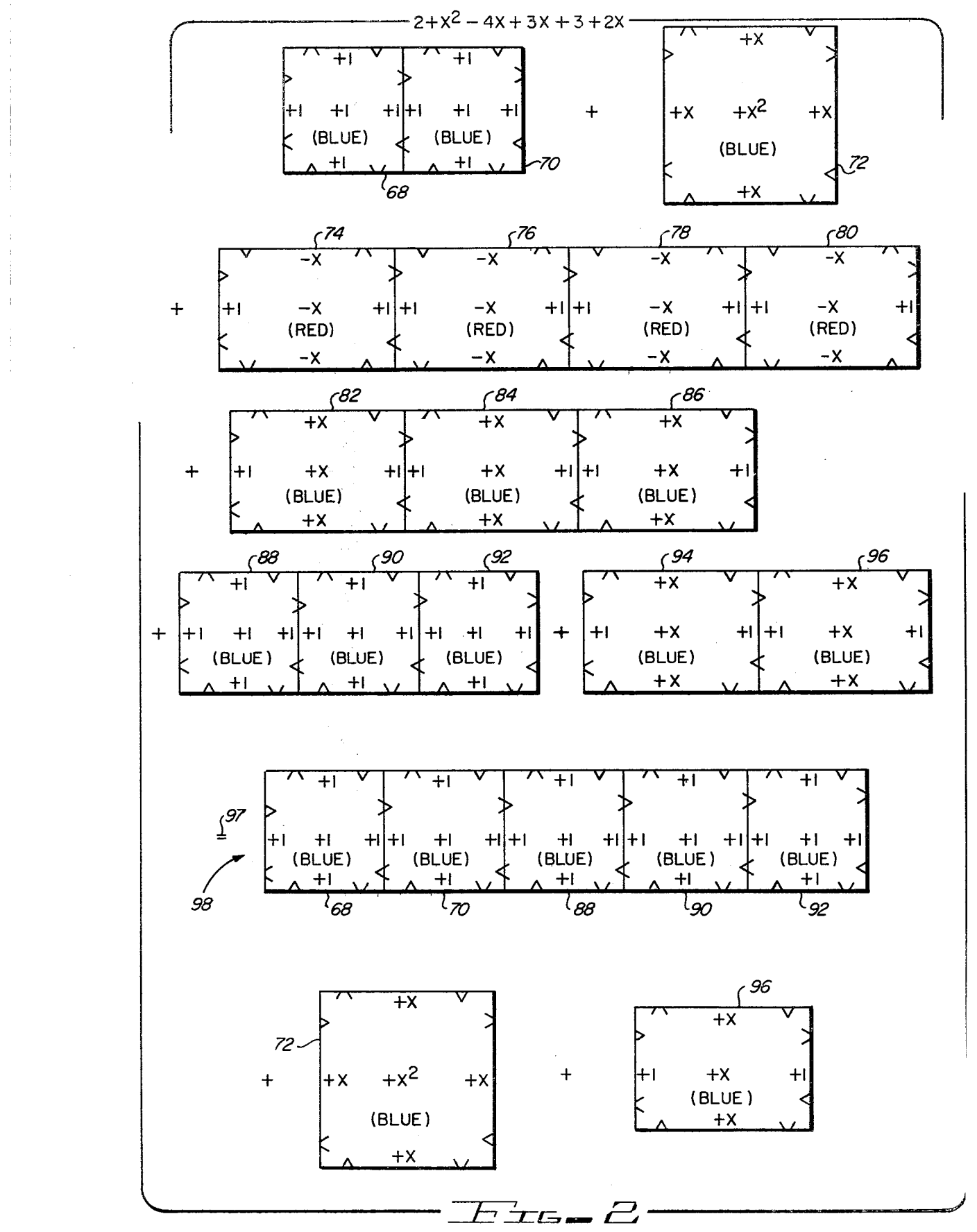

The first term "2" is represented by two of the +1 blocks, namely blocks 68 and 70 in FIG. 2. The only way that these two +1 blocks can be joined edge-to-edge is in the fashion shown. The term $+X^2$ is represented by a single one of the $+X^2$ blocks, as indicated by reference numeral 72. The term $-4X$ is represented by four of the $-X$ blocks 74, 76, 78 and 80. The term $3X$ is repesented by three of the $+X$ blocks 82, 84, and 86. The term "3" is represented by three of the +1 blocks 88, 90 and 92 joined as shown. The last term $2X$ is represented by two of the $+X$ blocks 94 and 96.

To accomplish the desired addition, the student attempts to mate the above combinations of mathematics blocks by joining them in edge-to-edge contact, if possible. The student will soon learn that the two already matched +1 blocks 68, and 70 can be easily joined with the already joined blocks 88, 90 and 92, as shown in the group designated by reference numeral 98. The student will readily see that the $+X^2$ block 72 can't be grouped with any of the other blocks. The student will also see that there are five $+X$ blocks, namely 82, 84, 86, 94 and 96. Four of these are "offset" by the negative $-X$ blocks 74, 76, 78 and 80, leaving only one $+X$ block, which is selected to be 96 and is shown on the bottom of FIG. 2. Thus, the answer to the above addition problem is given by the group of mathematics blocks shown in FIG. 2 below the equal sign 97, i.e., $$5 + X^2 + X$$

This is an elementary example of the use of the mathematics block, quite similar to use of prior art aids for teaching addition and subtraction. By using the above techniques of grouping identical types of the mathematical blocks on opposite sides of an equation and performing equal addition or subtraction operation on both sides of the equations, the described mathematical blocks can be helpful in teaching a student to solve simple algebraic equations.

However, in accordance with the present invention, the greatest advantage of the mathematics blocks of the present invention is their use in enabling students to conceptualize the operations of breaking second order algebraic expressions up into factors in order to solve such equations. As algebra students always eventually learn, if all terms of a second order algebraic equations are set equal to zero, and if the resulting expression can be factored, then solution of that equation is simplified to the solution of two simple first order equations. Therefore, a thorough understanding of the factoring operation is important to students. To illustrate how the mathematical blocks of the invention are helpful to a student learning how to perform the mathematical operation of factoring, it will be helpful to refer to FIG. 3, wherein a group of the mathematical blocks have been assembled to represent the expression $$X^2 + 5X + 4.$$

Figure 3:
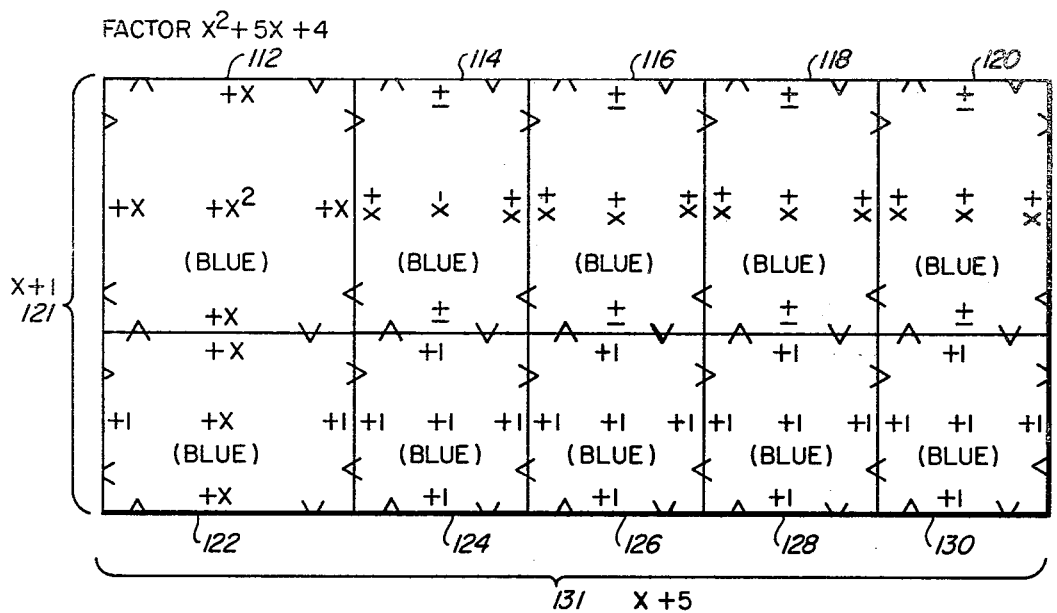
FIG. 3 is a plan view of blocks of the invention grouped to illustrate an operation of factoring an algebraic expression.

Since the foregoing expression includes only one $X^2$ term, block 112 in FIG. 3 is the only $+X^2$ block needed. The problem then becomes how to assemble block 112 with five of the $+X$ blocks and four of the $+1$ blocks in order to obtain a rectangle. If this can be done, then in accordance with the present invention, the factors of the foregoing algebraic expression are equal to the lengths of two sides of that rectangle.

A student experimenting with an adequate supply of the mathematical blocks of FIGS. 1A and 1B will soon be able to determine that the bottom edge (such as edge 2BE of FIG. 1A) of a $+X$ block mates perfectly with only with the right edge 3RE of a $+X$ block and the top edge 2TE of another $+X$ block. Thus, without too much experimentation, the student should be able to place $+X$ blocks 114, 116, 118 and 120 as shown in FIG. 3E.

However, at this point, the student will have one more $+X$ block, namely block 122 and four $+1$ blocks, namely 124, 126, 128 and 130. The student will have to detemine how to arrange these blocks with the foregoing blocks to obtain a rectangle. The student should be able to determine without too much experimentation that the $+1$ edge indicia or dimensions of the $+1$ blocks can be easily mated with each other and with the $+1$ dimension edges of the $+X$ blocks 114, 116, 118 and 120. But the shape of the arrangement will not be rectangular unless the remaining $+X$ block 122 is positioned so its $+1$ dimension edge mates with one of the $+1$ blocks and its $+X$ dimension edge mates with the $+X^2$ block 112. Before too long, most students will arrive at the rectangular arrangement shown in FIG. 3. The length of each side of the rectangle is determined by adding up the dimension numers of the mathematics blocks forming that edge. Thus, the length 131 in FIG. 3 is equal to $X+5$, and the length of the other edge of the rectangle, as designated by reference numeral 121 in FIG. 3, is X+1. Thus, the two factors of the expression $X^2+5X+4$ are X+1 and X+5. The rectangular configuration helps the student visualize the factoring process and contributes to his understanding of it.

In algebra, some trinomials such as $$X^2-X-2$$

must be factored in a different manner. In this example, shown in FIG. 4A, the student will not be able to make a rectangle by adjoining one of the $+X^2$ blocks, one of the −X blocks, and two of the −1 blocks. If the student attempts to do so, he will probably arrive at the combination shown in FIG. 4A because the +X edge dimension of the −X block must be mated to a side of a +X square block 132 having a +X edge dimension and the −1 dimension of the −X block 134 must be mated to a −1 dimension side of one of the −1 blocks such as 136 or 138.

Figure 4A:
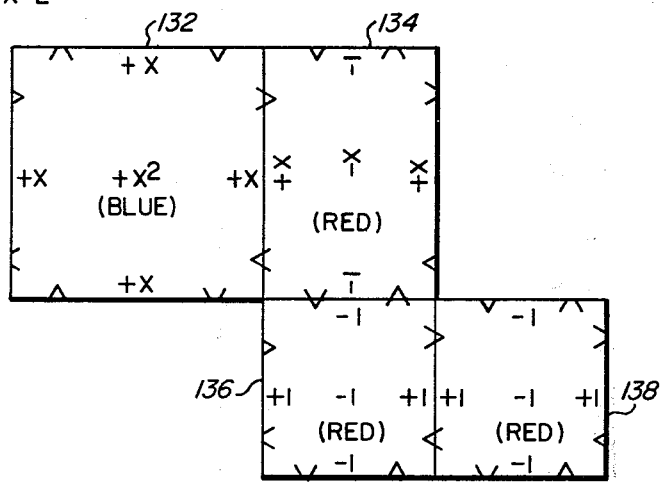
FIGS. 4A and 4B illustrate use of blocks of the invention to accomplish another factoring operation.
Figure 4B:
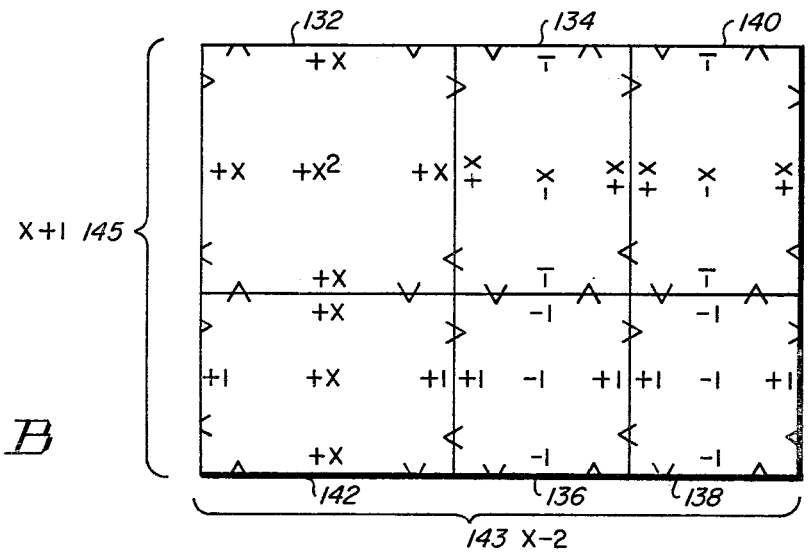

However, the student can complete the arrangement shown in FIG. 4A by, in effect, adding the number 0. This can be done by adding an additional −X block, namely 140, and a +X block, namely 142, as shown in FIG. 4B. The +X and −X values of these two blocks algebraically add up to zero. The factors of the above expression then are indicated by the lengths of the sides of the rectangle, shown in FIG. 4B, namely the dimension X+1, as indicated by reference numeral 145 and the dimension X−2, as indicated by reference numeral 143.

The final example herein illustrates the procedure for the mathematical operation of completing the square for the expression $$X^2+6X.$$

Figure 5:
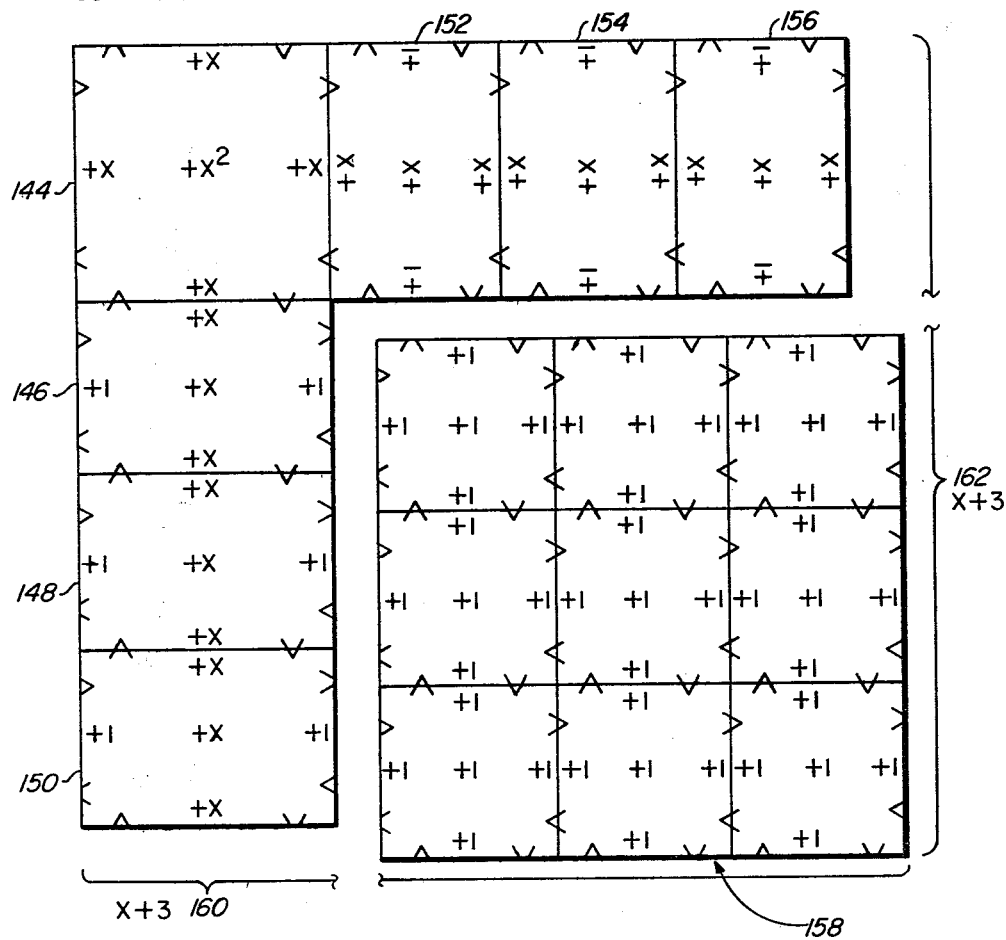
FIG. 5 is a plan view illustrating use of the blocks of the present inventon to accomplish the mathematical operation of completing the square of an algebraic expression.

In assemblying mathematical blocks representing the expression $X^2+6$, $+X^2$ block 144 of FIG. 5 represents the single $X^2$ term. The student can easily see that the +X edge dimension easily mates with the +X edge dimension of the +X blocks. Therefore, the student can readily produce the arrangement including blocks 144, 146, 148, 150, 152, 154 and 146 aligned as shown in FIG. 5. Of course, this arrangement is not a rectangle, but its shape suggests that the configuration could be "completed" to make a square if a suitable number of +1 blocks have their +1 dimension edges mated with the +1 dimension edges of the above-mentioned +X blocks 146, 148, 150, 152, 154 and 146. The student will very easily be able to position nine additional +1 blocks, as indicated by reference numeral 158, against the L-shaped arrangement of the original blocks that represents the expression $X^2+6X$. The expression representing the completed square then will have its factors equal to X+3, as indicated by the dimensions 160 and 162 in FIG. 5.

The blocks can be made of stiff cardboard paper or paper such as 120 weight paper. Alternately, they can be made of suitable plastic material.

My experience in experimentally using the above set of mathematical blocks to aid in teaching the above-mentioned concepts to high school students has shown me that the blocks and techniques described above greatly enhance the students learning and understanding of these concepts. Many students have gained this understanding much more rapidly than they would have using conventional textbook methods.

While the invention has been described with reference to particular embodiments of the invention, variations that are substantial equivalents of the described set of mathematical blocks and the described methods of using them are intended to be encompassed within the true spirit and scope of the invention.

I claim:

1. A set of mathematical blocks useful in teaching and learning mathematics, each of said blocks having a front face, a back face, and, with reference to its front face, a top edge, a right edge, a bottom edge, and a left edge, said set comprising in combination:

a plurality of said blocks that are referred to as +1 blocks, each having on its front face four edge dimension indicia referred to as +1 dimensions adjacent to its top, right, bottom, and left edges, respectively, and having on its back face four edge dimension indicia referred to as −1 dimensions adjacent to its top, right, bottom, and left edges, respectively;

a plurality of said blocks that are referred to as +X blocks each having on its front face two edge dimension indicia referred to as +X dimensions adjacent to its top and bottom edges and two edge dimension indicia referred to as +1 dimensions adjacent to its left and right edges, and having on its back face two edge dimension indicia referred to as −X dimensions adjacent to its top and bottom edges and two edge dimension indicia referred to as −1 dimension adjacent to its right and left edges, respectively;

a plurality of said blocks that are referred to as $+X^2$ blocks each having on its front face four edge dimension indicia referred to as +X dimensions adjacent to its top, right, bottom, and left edges, respectively, and having on its back face a plurality of edge dimension indicia referred to as −X dimensions adjacent to its top, right, bottom and left edges, respectively;

a plurality of said blocks referred to as −1 blocks each having on its front face two edge dimension indicia referred to as −1 dimensions adjacent to its top and bottom edges and two edge dimension indicia referred to as +1 dimensions adjacent to its right and left edges, respectively, and having on its back face two edge dimension indicia referred to as +1 edge dimensions adjacent to its top and bottom edges, respectively, and two edge dimension indicia referred to as −1 edge dimensions adjacent to its left and right edges, respectively;

a plurality of said blocks referred to as −X blocks each having on its front face two edge dimension indicia referred to as −X edge dimensions adjacent to its top and bottom edges and two edge dimension indicia referred to as +1 dimensions adjacent to its right and left edges and having on its back face two edge dimension indicia referred to as +X edge dimensions adjacent to its top and bottom edges and two edge dimension indicia referred to as −1 edge dimensions adjacent to its right and left edges;

a plurality of said blocks referred to as $-X^2$ blocks each having on its front face two edge dimension indicia referred to as −X edge dimensions adjacent to its top and bottom edges and two edge dimension indicia referred to as +X edge dimensions adjacent to its left and right edges and having on its back face two edge dimension indicia referred to as +X edge dimensions adjacent to its top and bottom edges and two edge dimension indicia referred to as −X edge dimensions adjacent to its right and left edges;

each of said +1, +X, and +X² blocks having at each of its edges and edge alignment means for effecting proper alignment of that edge with only one edge of any of the other blocks, the lengths of each of the edges of said blocks having a +1 edge dimension or a −1 edge dimension being equal, and the lengths of each of the edges of said blocks having a +X edge dimension or a −X edge dimension being equal, the edges with +X or −X edge dimensions being different in length than the edges having +1 or −1 edge dimensions, whereby various ones of said blocks can be arranged to form rectangles representing algebraic expressions wherein the sums of the dimension indicia of each side of the formed rectangle represent factors of the algebraic expression.

2. The set of mathematical blocks of claim 1 wherein said right edge and said left edge of each block are referenced to said front face of that block.

3. The set of mathematical blocks of claim 2 wherein the block type indicia +1 is disposed on the center portions of the front and back faces of each of said +1 blocks, the block face indicia −1 is disposed on the center portions of the front and back faces of each of said −1 blocks, the block type indicia +X is disposed on the center portions of the front and back faces of each of said +X blocks, the block type indicia −X is disposed on the center portions of the front and back faces of each of said +X blocks, the block type indicia +X² is disposed on the center portion of the front and back faces of each of said X² blocks, and the block type indicia −X² is disposed on the center portions of the front and back faces of each of said −X² blocks.

4. The set of mathematical blocks of claim 3 wherein each of said edge alignment means includes a tab extending outwardly from an edge and a groove complementary to that tab, each of the tabs being aligned with a groove on an opposite edge of the same block.

5. The set of mathematical blocks of claim 3 wherein each of said edge alignment means includes a plurality of marks, each of said marks being disposed on an edge of a first one of said blocks aligned with another of said marks that is disposed on an edge of a second one of said blocks when and only when said edges of said first and second blocks are properly aligned in edge to edge contact.

6. The set of mathematical blocks of claim 4 wherein each of said tabs is disposed directly opposite to one of said notches on the same block.

7. The set of mathematical blocks of claim 5 wherein each of said marks is disposed directly opposite to a corresponding mark on the same block.

8. A method of factoring an algebraic expression by using a set of blocks, each of said blocks having a front face, a back face, and with reference to its front face, a top edge, a right edge, a bottom edge, and a left edge, said method comprising:

marking on the front face of each of a plurality of said blocks that are referred to as +1 blocks four dimension indicia referred to as +1 dimension adjacent to its top, right, bottom, and left edges, respectively, and marking on its back face four dimension indicia referred to as −1 dimensions adjacent to its top, right, bottom, and left edges, respectively;

marking on the front face of each of a plurality of said blocks that are referred to as +X blocks two edge dimension indicia referred to as +X dimensions adjacent to its top and bottom edges and two edge dimension indicia referred to as +1 dimensions adjacent to its left and right edges, and marking on its back face two edge dimension indicia referred to as −X dimensions adjacent to its top and bottom edges and two edge dimension indicia referred to as −1 dimensions adjacent to its right and left edges, respectively;

marking on the front face of each of a plurality of said blocks that are referred to as +X² blocks four edge dimension indicia referred to as +X dimensions adjacent to its top, right, bottom, and left edges, respectively, and marking on its back face a plurality of edge dimension indicia referred to as −X dimensions adjacent to its top, right, bottom and left edges, respectively;

marking on the front face of each of a plurality of said blocks referred to as −1 blocks two edge dimension indicia referred to as −1 dimensions adjacent to its top and bottom edges and two edge dimension indicia referred to as +1 dimensions adjacent to its right and left edges, respectively and marking on its back face two edge dimension indicia referred to as +1 edge dimensions adjacent to its top and bottom edges, respectively, and two edge dimension indicia referred to as −1 edge dimensions adjacent to its left and right edges, respectively;

marking on the front face of each of a plurality of said blocks referred to as −X blocks two edge dimension indicia referred to as −X edge dimensions adjacent to its top and bottom edges and two edge dimension indicia referred to as +1 dimensions adjacent to its right and left edges and marking on its rear face two edge dimension indicia referred to as +X edge dimensions adjacent to its top and bottom edges and two edge dimension indicia referred to as −1 edge dimensions adjacent to its right and left edges;

marking on the front face of each of a plurality of said blocks referred to as −X² blocks two edge dimension indicia referred to as −X edge dimensions adjacent to its top and bottom edges and two edge dimension indicia referred to as +X edge dimensions adjacent to its left and right edges and marking on its rear face two edge dimension indicia referred to as +X edge dimensions adjacent to its top and bottom edges and two edge dimension indicia referred to as −X edge dimensions adjacent to its right and left edges;

each of said +1, +X, and +X² blocks having at each of its edges an edge alignment means for effecting proper alignment of that edge with only one edge of any of the other blocks, the lengths of each of the edges of said blocks having a +1 edge dimension or a −1 edge dimension being equal, and the lengths of each of the edges of said blocks having a +X edge dimension or a −X edge dimension being equal, the edges with +X or −X edge dimensions being greater in length than the edges having +1 or −1 edge dimensions, whereby various ones of said blocks can be arranged to form rectangles representing linear algebraic expressions wherein the sums of the edge dimension indicia of each side of the formed rectangle represent factors of the algebraic expression, said +X², +X and +1 blocks representing positive numbers and said $-X^2$, $-X$ and $-1$ blocks representing negative numbers;

arranging various ones of said blocks to produce a rectangular arrangement of said blocks wherein all joining edges of said blocks are properly aligned in accordance with said edge alignment means thereof; and adding the sums of the edge dimensions of the length and width of said rectangle to obtain the two factors of said expression.

9. The set of mathematical blocks of claim 1 wherein said $+1$ blocks, said $+X$ blocks, and said $+X^2$ blocks are a first color, and said $-1$ blocks, said $-X$ blocks, and said $-X^2$ blocks are a second color.

* * * * *